(12) United States Patent
King

(10) Patent No.: US 12,370,714 B2
(45) Date of Patent: Jul. 29, 2025

(54) SYSTEMS AND METHODS FOR CHAINSAW LUBRICANT DELIVERY CONTROL

(71) Applicant: TECHTRONIC CORDLESS GP, Anderson, SC (US)

(72) Inventor: Wade King, Victoria (AU)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/901,229

(22) Filed: Sep. 1, 2022

(65) Prior Publication Data
US 2023/0070451 A1     Mar. 9, 2023

(30) Foreign Application Priority Data
Sep. 8, 2021    (AU) ................. 2021229195

(51) Int. Cl.
*B27B 17/12*     (2006.01)
*F16N 13/06*     (2006.01)

(52) U.S. Cl.
CPC .............. *B27B 17/12* (2013.01); *F16N 13/06* (2013.01)

(58) Field of Classification Search
CPC ......... B27B 17/12; B27B 17/02; F16N 13/06; B23D 57/02; Y10T 83/263; F16K 31/602
See application file for complete search history.

(56) References Cited

U.S. PATENT DOCUMENTS

| 2,109,702 A | 3/1938 | Lange |
| 2,391,730 A | 12/1945 | Melvin |
| 2,650,626 A | 9/1953 | Kiekhaefer |
| 2,827,932 A | 3/1958 | Strunk |
| 2,883,000 A | 4/1959 | Mattson |
| 2,896,746 A | 7/1959 | Gudmundsen |
| 2,944,538 A | 7/1960 | Conway |

(Continued)

FOREIGN PATENT DOCUMENTS

| CN | 2744488 | 12/2005 |
| CN | 201092068 Y | 7/2008 |

(Continued)

OTHER PUBLICATIONS

CN-201579490-U English Translation; Sep. 2010 CN; Guo Z; B23D570/2.*

(Continued)

*Primary Examiner* — Laura M Lee
(74) *Attorney, Agent, or Firm* — Dority & Manning, P.A.

(57) ABSTRACT

Systems and methods which provide control of lubricant delivery with respect to chainsaws using a lubricant flow shutoff valve controlled in correspondence to an operational state of the chainsaw. A chainsaw lubricant delivery control system includes a lubricant flow shutoff valve and a chainsaw operation-based valve controller operable cooperatively to provide control of lubricant delivery to the cutting chain and guide bar assembly of a chainsaw. The chainsaw operation-based valve controller is coupled to an operationally active element of the chainsaw wherein the chainsaw operation-based valve controller may control the lubricant flow shutoff valve between an open position and a closed position responsive to detecting a particular state of the operationally active element corresponding to an operational state of the chainsaw.

17 Claims, 11 Drawing Sheets

(56) References Cited

U.S. PATENT DOCUMENTS

| | | | |
|---|---|---|---|
| 3,010,538 A | 11/1961 | Strunk | |
| 3,332,411 A | 7/1967 | Bloom | |
| 3,763,962 A | 10/1973 | Gottlieb | |
| 3,776,369 A * | 12/1973 | Schrack | F02B 63/02 |
| | | | 123/196 CP |
| 3,865,213 A | 2/1975 | McDermott | |
| 4,094,382 A | 6/1978 | Lee | |
| 4,175,909 A | 11/1979 | White | |
| 4,321,750 A | 3/1982 | Sugihara | |
| 4,335,514 A | 6/1982 | Overy et al. | |
| 4,353,163 A | 10/1982 | Overbury | |
| 4,465,440 A | 8/1984 | Thomsen et al. | |
| 4,594,780 A | 6/1986 | Schliemann et al. | |
| 4,753,012 A | 6/1988 | Schurr | |
| 4,760,646 A | 8/1988 | Siegler | |
| 4,802,555 A | 2/1989 | Matsunaga | |
| 4,884,781 A * | 12/1989 | Barnett | F16K 21/10 |
| | | | 251/23 |
| 5,042,626 A | 8/1991 | Dohse et al. | |
| 5,184,403 A * | 2/1993 | Schliemann | B27B 17/12 |
| | | | 30/382 |
| 5,212,886 A * | 5/1993 | Tasaki | B27B 17/0008 |
| | | | 30/381 |
| 5,305,528 A | 4/1994 | Garrison | |
| 5,603,311 A * | 2/1997 | Hoerner | B28D 1/082 |
| | | | 125/21 |
| 5,709,032 A | 1/1998 | Mizutani et al. | |
| 5,791,057 A | 8/1998 | Nakamura et al. | |
| 5,813,123 A | 9/1998 | Wieland et al. | |
| 5,915,795 A | 6/1999 | Nakamura et al. | |
| 6,186,136 B1 * | 2/2001 | Osborne | B27B 17/12 |
| | | | 451/298 |
| 6,442,841 B1 * | 9/2002 | Nilsson | B23D 59/02 |
| | | | 30/389 |
| 7,713,111 B2 * | 5/2010 | Layher | B23D 59/02 |
| | | | 451/450 |
| 8,215,216 B2 * | 7/2012 | Dale | B27B 13/12 |
| | | | 83/171 |
| 8,627,572 B2 | 1/2014 | Martinsson et al. | |
| 8,661,951 B2 * | 3/2014 | Gorenflo | B27B 17/083 |
| | | | 83/61 |
| 8,672,162 B2 | 3/2014 | Okouchi | |
| 9,403,226 B2 * | 8/2016 | Fu | B23D 57/023 |
| 9,470,143 B2 | 10/2016 | Karrar et al. | |
| 9,656,336 B2 * | 5/2017 | Petersson | B28D 7/02 |
| 10,307,931 B2 | 6/2019 | Haney | |
| 10,846,250 B2 * | 11/2020 | Thomas | G06F 13/4022 |
| 11,267,160 B2 * | 3/2022 | Bylund | B23D 59/04 |
| 2002/0073551 A1 | 6/2002 | Goodwin | |
| 2005/0025636 A1 | 2/2005 | Durr | |
| 2008/0092399 A1 | 4/2008 | Myers | |
| 2009/0193669 A1 * | 8/2009 | Gorenflo | B27B 17/083 |
| | | | 30/277.4 |
| 2010/0043234 A1 * | 2/2010 | Pellenc | B27B 17/12 |
| | | | 30/515 |
| 2016/0257026 A1 * | 9/2016 | Lux | B27B 17/02 |
| 2017/0021523 A1 * | 1/2017 | Haney | B27B 17/12 |
| 2017/0072584 A1 * | 3/2017 | Pellenc | B27B 17/02 |
| 2018/0015632 A1 | 1/2018 | Johansson | |
| 2018/0215002 A1 | 8/2018 | Gorenflo | |
| 2022/0072732 A1 * | 3/2022 | Schlosser | B27G 19/003 |
| 2023/0070451 A1 * | 3/2023 | King | B27B 17/12 |
| 2023/0173708 A1 * | 6/2023 | Burden | F16N 7/38 |
| | | | 30/123.4 |
| 2025/0100174 A1 * | 3/2025 | Krantz | B27B 17/12 |

FOREIGN PATENT DOCUMENTS

| | | | |
|---|---|---|---|
| CN | 101380745 A | | 3/2009 |
| CN | 201419283 Y | | 3/2010 |
| CN | 201579490 U | * | 9/2010 |
| CN | 202045687 U | | 11/2011 |
| CN | 202344035 U | * | 7/2012 |
| CN | 103770157 A | | 5/2014 |
| CN | 204295792 U | | 4/2015 |
| CN | 207140006 U | | 3/2018 |
| CN | 108274540 | | 7/2018 |
| CN | 207841595 | | 9/2018 |
| CN | 109968458 | | 7/2019 |
| CN | 210371752 U | | 4/2020 |
| DE | 3320761 | | 12/1984 |
| DE | 3639650 A1 | | 6/1988 |
| DE | 19908939 | | 9/2000 |
| EP | 1066933 A2 | | 1/2001 |
| EP | 1468796 A1 | | 10/2004 |
| EP | 2992755 B1 | | 7/2017 |
| GB | 1291035 | | 9/1972 |
| GB | 2336987 A | | 11/1999 |
| GB | 2367344 | | 4/2002 |
| WO | WO9413441 A2 | | 6/1994 |
| WO | WO2014070052 | | 5/2014 |
| WO | WO2015133940 A1 | | 9/2015 |
| WO | WO-2023072249 A1 | * | 5/2023 |

OTHER PUBLICATIONS

CN-202344035-U English Translation Jul. 2012 CN Duan S; B23D570/2.*
WO-2023072249-A1 English translation May 2023 WO Jiang Y; B23D570/2.*
CN-201579490-U English Translation; Sep. 15, 2010 Guo.*
CN-202344035-U English translation; Jul. 25, 2012 Duan.*
WO-2023072249-A1 English translationl May 4, 2023 Jiang.*

* cited by examiner

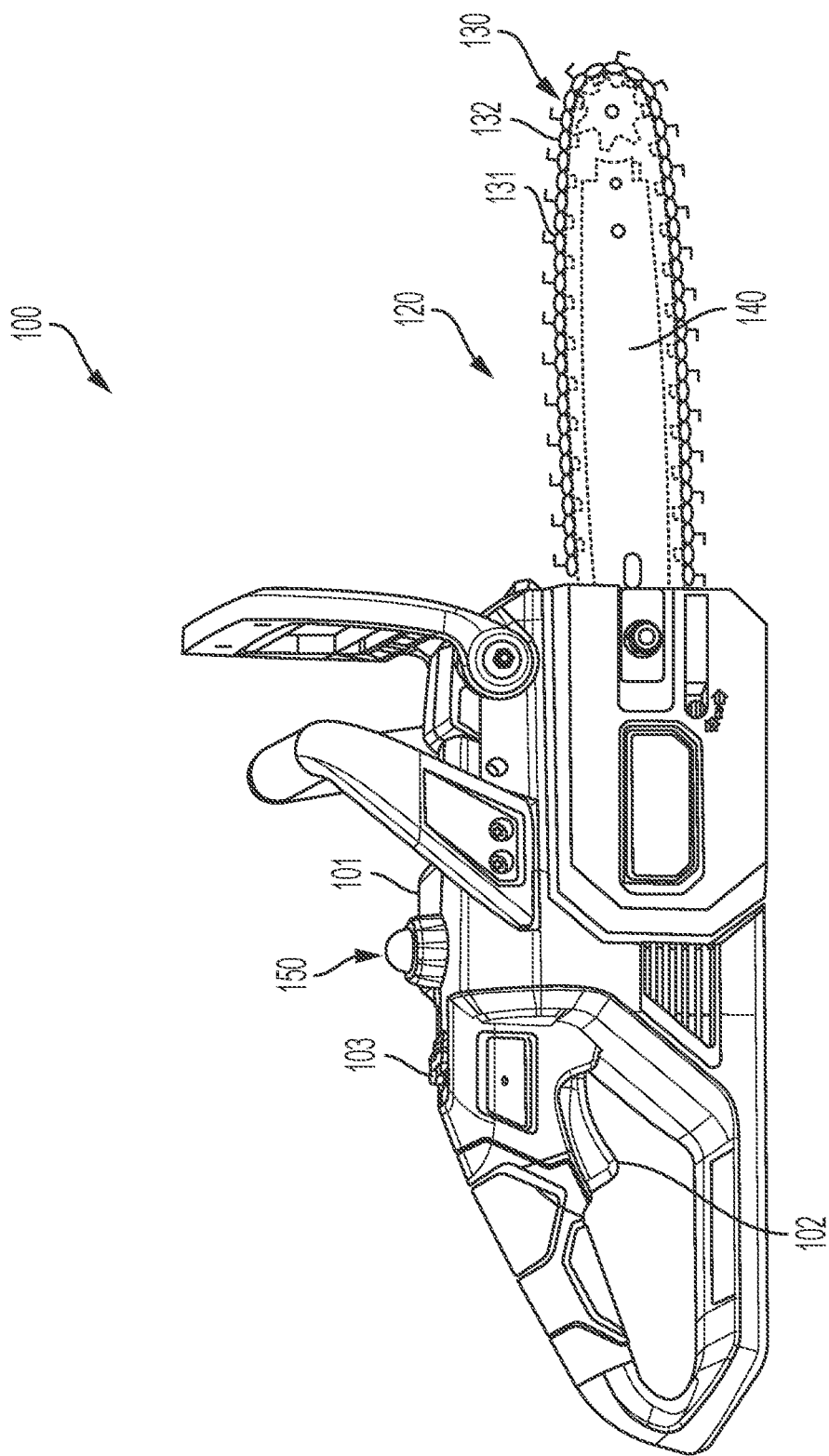

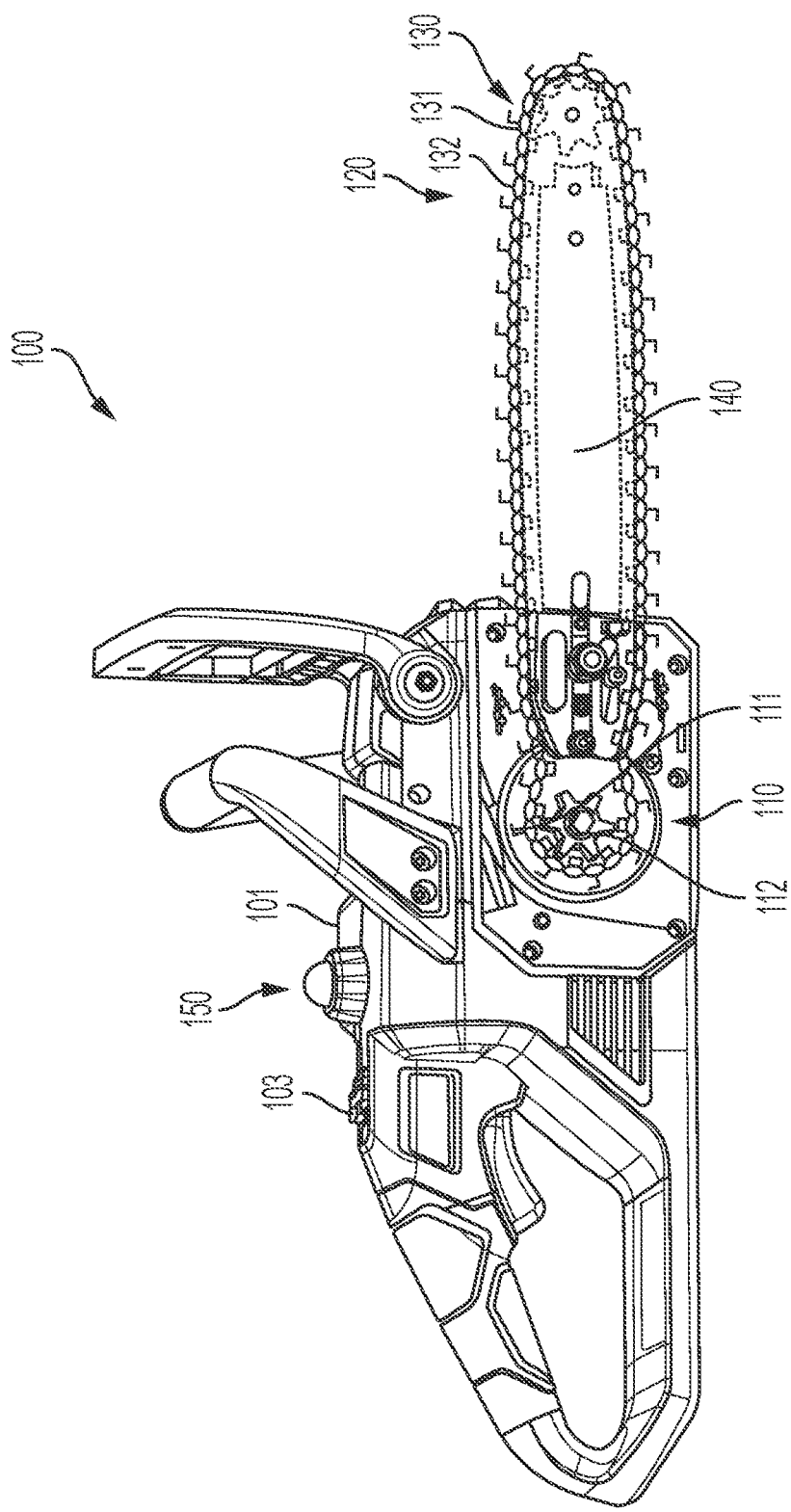

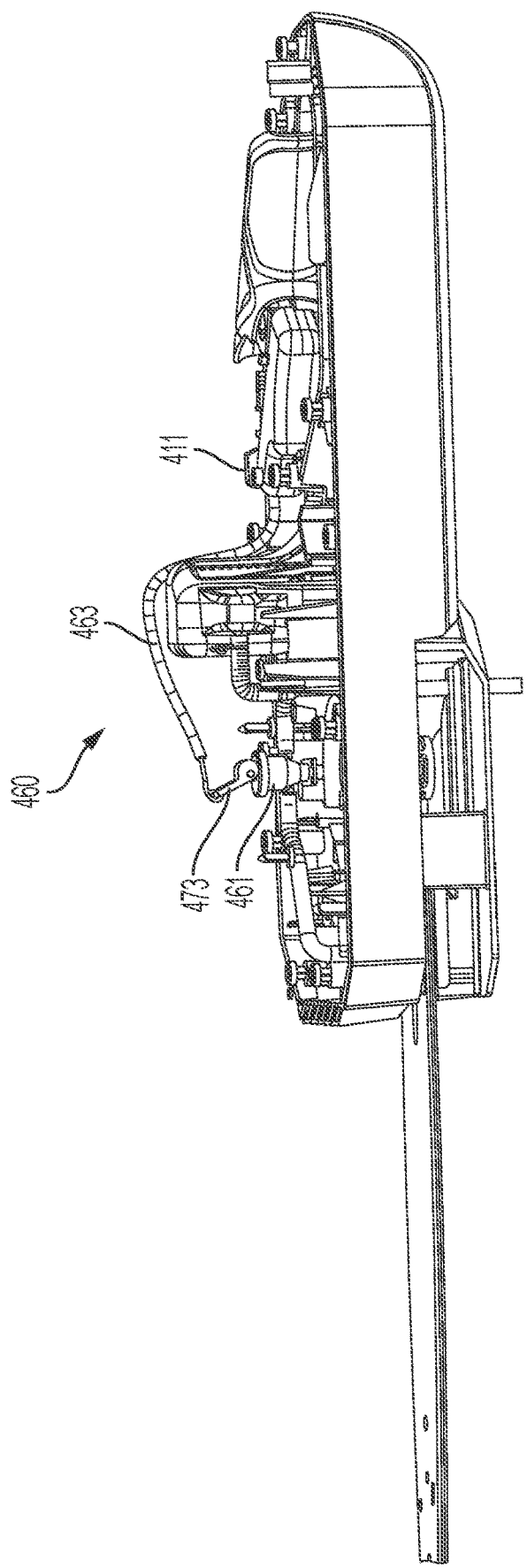

SYSTEMS AND METHODS FOR CHAINSAW LUBRICANT DELIVERY CONTROL

This application claims the benefit of priority to Australian Patent Application No. 2021229195, filed on Sep. 8, 2021, the disclosure of all of which is incorporated by reference herein in its entirety.

TECHNICAL FIELD

The present invention relates generally to chainsaws and, more particularly, to control of lubricant delivery with respect to chainsaws.

BACKGROUND OF THE INVENTION

Various forms of powered saws, referred to as chainsaws, that cut using a set of cutting teeth attached to a rotating cutting chain are in common use for performing a number of tasks. For example, chainsaws are often used for tree felling, limbing, bucking, pruning, cutting firebreaks in wildland fire suppression, harvesting of firewood, etc.

Chainsaws typically include a powerhead (e.g., gasoline-, electric-, or battery-powered motor and associated drivetrain) driving the rotating cutting chain along a guide bar. For example, the cutting chain generally includes an alternating series of cutting links and drive links forming a loop. The cutting links typically have teeth disposed upon their upper part for cutting various material as the cutting chain is rotated in contact with the material. A lower part of the drive links generally includes members which fit into a slot or groove (referred to as a gauge) provided around the circumferential edge of the guide bar. A drive sprocket of the powerhead drivetrain engages the drive link members of the cutting chain and provides the motive force to provide rotation of the cutting chain. As the chain rotates, the drive link members slide within the gauge of the guide bar, and thus the cutting chain is supported and guided by the guide bar.

Sliding of the cutting chain drive link members within the gauge of a guide bar presents a potential for wear and/or resistance to rotation of the cutting chain. For example, the drive link member to guide bar interface within the gauge of the guide bar typically presents a metal to metal sliding interface which may result in significant friction and wearing-away of surfaces.

Chainsaws often implement a lubrication system to deliver lubrication (e.g., in the form of machine oil) to the guide bar. For example, the lubrication system may include a lubricant reservoir and lubrication pump (e.g., manual or automatic pump) for delivering lubricant from the lubricant reservoir to the guide bar, such as by one or more lubricant delivery pathways. The guide bar may include one or more lubricant outlets in communication with the gauge of the guide bar, wherein lubricant is delivered to the area within the groove of the gauge by the lubrication system. The drive link members of a rotating cutting chain may pass through a delivery point of the lubricant within the gauge and distribute the lubricant within the gauge (e.g., around the circumference of the guide bar) to thereby provide lubrication of the interface of the gauge and drive link members.

Chainsaw lubrication systems are often prone to leakage of the lubricant. For example, air trapped in the lubricant reservoir may expand with changes in temperature an act to push lubricant from the lubricant reservoir and cause lubricant to be delivered to the guide bar via the lubricant outlet(s). Thus, when the chainsaw is stored during periods of non-use, lubricant may migrate from the lubricant reservoir, through the lubricant delivery pathways, to the guide bar. The amount of lubricant which migrates into the guide bar is often sufficient so as to be noticeable. For example, a user may detect excess lubricant upon external surfaces of the chainsaw (e.g., areas of the guide bar and/or cutting chain), causing concern that the chainsaw or its powerhead is malfunctioning. Moreover, the leaking lubricant may drip or otherwise trickle from the chainsaw and cause visible, sometimes permanent, staining of surrounding surfaces.

Some prior attempts have been made to curtail the leakage of lubricant from a chainsaw. One such attempt, as shown in U.S. patent publication number 2015/0298344A1, has been to add an air chamber in communication with the lubricant reservoir and a breather having a pressure relief valve so as to accommodate expansion of air within the lubricant reservoir and mitigate pressure pushing the lubricant from the reservoir. Such solutions may not, however, provide a satisfactory solution. For example, the added air chamber may occupy an appreciable amount of space, which may not be readily accommodated in all situations. Moreover, the particular orientation of the air chamber to a chamber containing the lubricant may present challenges in accommodating in many implementations. The air chamber may be of insufficient size to compensate for relatively large fluctuations in temperature/pressure. Further, the use of a pressure relief valve may present challenges with respect to venting only air (i.e., not also allowing lubricant to exit via the valve), and may easily be plugged or otherwise obstructed in the typically dirty environment in which chainsaws are operated.

BRIEF SUMMARY OF THE INVENTION

The present invention is directed to systems and methods which provide control of lubricant delivery with respect to chainsaws using a lubricant flow shutoff valve controlled in correspondence to an operational state of the chainsaw. Embodiments of the invention may operate to allow or prevent the flow of lubricant (e.g., machine oil) to a cutting chain and guide bar assembly of a chainsaw in correspondence to operation of the chainsaw. For example, the lubricant flow shutoff valve may be controlled to prevent or otherwise obstruct flow of lubricant (e.g., the valve being placed in a closed position) from a lubricant reservoir to the cutting chain and guide bar assembly when the chainsaw is in a first state (e.g., an idle state in which the powerhead is turned off, the powerhead is throttled down, the powerhead is operating at a non-cutting power level, the cutting chain is not rotating, etc.). Correspondingly, the lubricant flow shutoff valve may be controlled to allow or otherwise permit flow of lubricant (e.g., the valve being placed in an open position) from the lubricant reservoir to the cutting chain and guide bar assembly when the chainsaw is in a second state (e.g., an active state in which the power head is throttled up, the powerhead is producing power at a cutting power level, the cutting chain is rotating, etc.).

In accordance with some embodiments of the invention, operational states (e.g., the first or idle state, the second or active state, etc.) of the chainsaw may be indicated by one or more operationally active element (e.g., throttle control, chain brake mechanism, chain drive mechanism clutch, etc.). For example, the throttle control being engaged/disengaged, the chain brake mechanism being released/activated, the chain drive mechanism clutch being engaged/disengaged may correspond to active/idle states of the chainsaw. A chainsaw operation-based valve controller of embodiments may control the lubricant flow shutoff valve between an open position and a closed position responsive to an operational state of the chainsaw as indicated by such an operationally active element.

Consistent with the foregoing, a chainsaw lubricant delivery control system of embodiments of the invention may include a lubricant flow shutoff valve and a chainsaw operation-based valve controller. The lubricant flow shutoff valve and chainsaw operation-based valve controller of embodiments are operable cooperatively to provide control of lubricant delivery to the cutting chain and guide bar assembly of a chainsaw.

According to embodiments of the invention, a lubricant flow shutoff valve may be disposed within a chainsaw between a lubrication system lubricant reservoir and a guide bar lubricant outlet. Various configurations of valve mechanisms may be utilized in implementing a lubricant flow shutoff valve in accordance with concepts herein. For example, a lubricant flow shutoff valve of some embodiments may comprise a ball valve, a gate valve, a butterfly valve, or a plug valve.

The lubricant flow shutoff valve of some examples may be disposed at an outlet of the lubricant reservoir that introduces lubricant to a lubrication system lubricant delivery pathway in fluid communication with the guide bar lubricant outlet. In another example, the lubricant flow shutoff valve may be disposed in a lubrication system lubricant delivery pathway providing fluid communication between the lubricant reservoir and the guide bar lubricant outlet. In yet another example, the lubricant flow shutoff valve may be disposed at the guide bar lubricant outlet. The foregoing examples may be implemented with respect to both automatic and manual lubrication pump configurations. The lubricant flow shutoff valve of some examples may be disposed at an lubricant inlet or outlet of a lubrication system lubricant pump, such as in an automatic lubrication pump configuration implementation.

According to embodiments of the invention, a chainsaw operation-based valve controller may be coupled to an operationally active element of the chainsaw and a lubricant flow shutoff valve. In accordance with some examples, the chainsaw operation-based valve controller may comprise a mechanical apparatus for controlling the lubricant flow shutoff valve. For example, the chainsaw operation-based valve controller may comprise one or more linkages coupling the operationally active element of the chainsaw with a valve actuator of the lubricant flow shutoff valve. According to some examples, the chainsaw operation-based valve controller may comprise an electronic control system for controlling the lubricant flow shutoff valve. For example, the chainsaw operation-based valve controller may comprise a control circuit and an actuator manipulator in electrical communication with the control circuit. The control circuit may comprise one or more sensors configured to monitor a state of the operationally active element and to control the actuator manipulator coupled to a valve actuator of the lubricant flow shutoff valve responsive to states indicated by the one or more sensors.

In operation, the chainsaw operation-based valve controller may control the lubricant flow shutoff valve between an open position and a closed position responsive to detecting a particular state of the operationally active element. For example, the chainsaw operation-based valve controller may actuate the lubricant flow shutoff valve to place the lubricant flow shutoff valve in an open position responsive to the operationally active element of the chainsaw being in a first state (e.g., throttle control engaged state, chain brake mechanism released state, chain drive mechanism clutch engaged state, etc. corresponding to an active state of the chainsaw). Correspondingly, the chainsaw operation-based valve controller may actuate the lubricant flow shutoff valve to place the lubricant flow shutoff valve in a closed position responsive to the operationally active element of the chainsaw being in a second state (e.g., throttle control disengaged state, chain brake mechanism engaged state, chain drive mechanism clutch disengaged state, etc. corresponding to an idle state of the chainsaw).

Chainsaw lubricant delivery control provided according to embodiments of the present invention prevents or otherwise discourages unintended leakage of lubricant from the chainsaw lubrication system. In accordance with embodiments of the invention, the lubricant flow shutoff valve of a chainsaw lubricant delivery control system implemented in accordance with concepts herein may lubricant leakage when the chainsaw is not in active use. For example, leakage of lubricant precipitated by air trapped in the lubricant reservoir expanding with changes in temperature may be prevented when the chainsaw is stored. Moreover, the obstruction to fluid flow provided by a lubricant flow shutoff valve of embodiments of the invention may accommodate relatively large fluctuations in temperature/pressure while continuing to prevent lubricant leakage. According to some examples, leakage of lubricant or the presence of excessive amounts of lubricant (e.g., at the cutting chain and guide bar assembly) that may result in dripping lubricant or other undesired conditions may be avoided when the chainsaw is being operated but not actively cutting.

It should be appreciated that the lubricant flow shutoff valve and chainsaw operation-based valve controller of chainsaw lubricant delivery control systems of implementations in accordance with concepts of the present invention provide lubricant leakage prevention solutions which may be adapted to and accommodated by a variety of chainsaw configurations. For example, the lubricant flow shutoff valve and chainsaw operation-based valve controller may be implemented using relatively little space. Moreover, the components of a chainsaw lubricant delivery control implantation may be configured and disposed to be accommodated in space available with respect to a particular host chainsaw configuration. Further, the lubricant flow shutoff valve and chainsaw operation-based valve controller of chainsaw lubricant delivery control systems of embodiments provide implementations which are robust and resilient to provide continued and reliable operation in the typically dirty environment in which chainsaws are operated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 1A-1C show an example of a chainsaw in which lubricant delivery control of embodiments of the invention is implemented;

FIGS. 3A, 3B, and 4A-4D show examples of chainsaw lubricant delivery control systems of embodiments of the invention.

DETAILED DESCRIPTION OF THE INVENTION

Figure 1C:
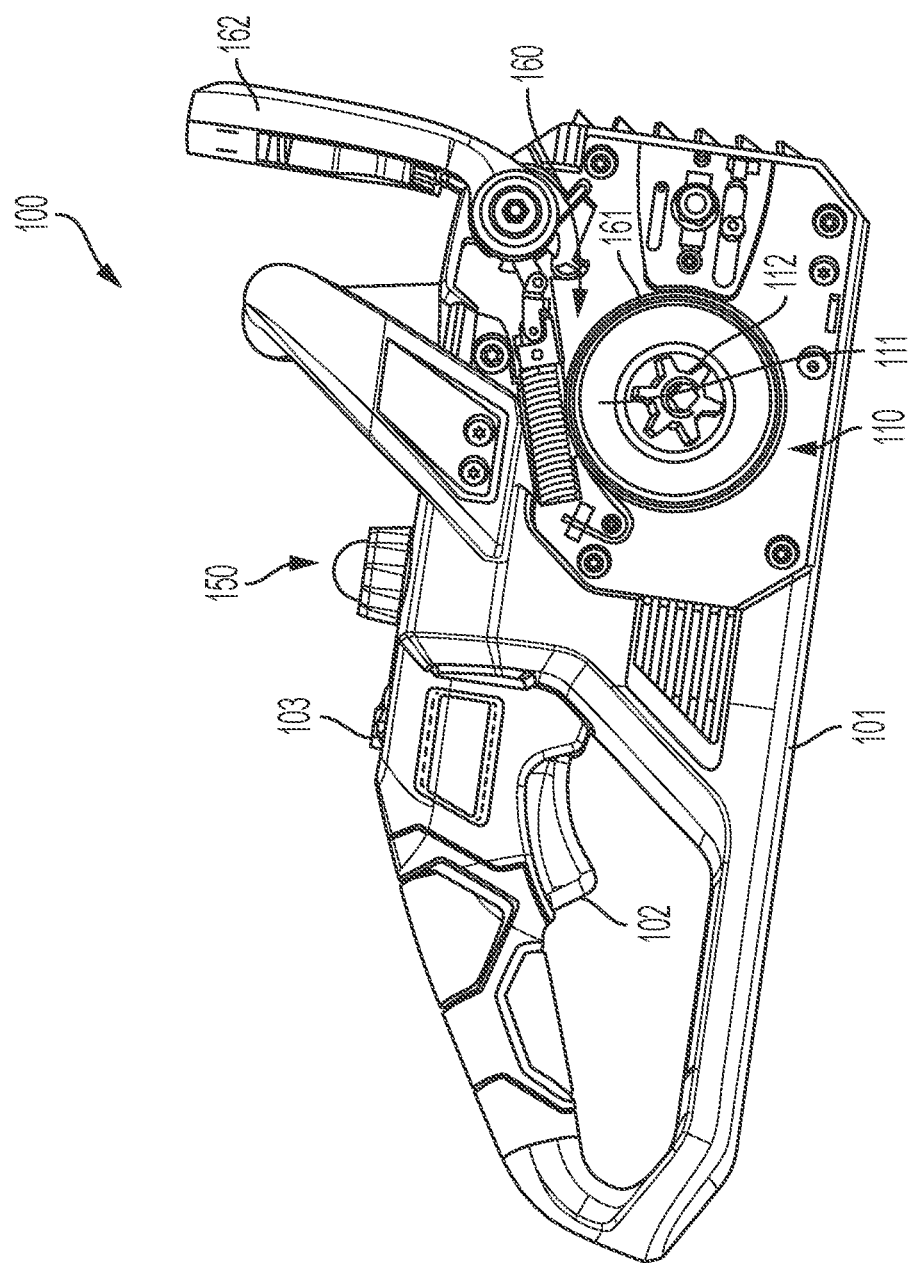

FIGS. 1A-1C show an example chainsaw configuration in which chainsaw lubricant delivery control according to concepts of the invention may be implemented. Chainsaw 100 of the illustrated example comprises a powered saw configuration that uses cutting teeth attached to a rotating cutting chain for cutting various materials. Accordingly, chainsaw 100 includes a powerhead (indicated generally as powerhead 110 in FIGS. 1B and 1C), disposed within housing 101, comprising a motor and associated drive train coupled to cutting chain and guide bar assembly 120. Powerhead 110 of embodiments may, for example, be controlled (e.g., the powerhead controllably throttled up and down) by an operator via throttle trigger 102. In the illustrated embodiment, the powerhead comprises a battery-powered motor. However, configurations of chainsaws implementing a chainsaw lubricant delivery control system of embodiments of the invention may comprise other forms of powerheads (e.g., using a gasoline-powered motor, an electric-powered or electric line-powered motor, etc.).

Cutting chain and guide bar assembly 120 shown in FIGS. 1A and 1B includes cutting chain 130 and guide bar 140. Cutting chain 130 of this example includes an alternating series of cutting links 131 and drive links 132 forming a loop. As can be seen in FIGS. 1A and 1B, cutting links 131 have teeth disposed upon their upper part for cutting various material as the cutting chain is rotated in contact with the material. Drive links 132 include drive link members disposed upon their lower part. The drive link members are configured both to fit into the gauge (e.g., a slot or groove) provided around the circumferential edge of guide bar 140 and to engage a drive sprocket of powerhead 110. For example, drive sprocket 112 driven by chain drive mechanism clutch 111 of powerhead 110 engages the drive link members of cutting chain 130, and thus may transfer motive force from powerhead 110 to cutting chain 130 to provide rotation of the cutting chain around the circumference of guide bar 140.

Chain drive mechanism clutch 111 may, according to embodiments, comprise a centrifugal clutch coupled to drive sprocket 112. In operation according to examples, the centrifugal clutch expands with increasing speed, engaging a drum of the clutch assembly. Drive sprocket 112 is disposed (e.g., either fixedly or removably) on the drum so that when the centrifugal clutch engages the drum, the drum and drive sprocket rotate. Accordingly, when the motor is off, running at low speed or at idle (e.g., below approximately 2500-2700 revolutions per minute (RPM)) the chain drive clutch is disengaged and the cutting chain does not move under power of the motor. When the clutch is engaged and the cutting chain stops in the material being cut (e.g., wood) or for another reason, the centrifugal clutch will disengage and protect the motor.

One or more safety feature may be implemented with respect to chainsaw 100 of embodiments. A safety feature may, for example, prevent unintended operation or activation of the cutting chain and/or its drive mechanism, may provide for stopping operation of the cutting chain and/or its drive mechanism under certain circumstances, etc.

In one example of a safety feature, chainsaw 100 of the illustrated embodiment includes safety switch 103, as shown in FIGS. 1A-1C, provided for prevention of accidental or unintentional movement of throttle trigger 102. For example, safety switch 103 may comprise or otherwise be coupled to a trigger interlock which prevents depression of throttle trigger 102, and thus motor operation that would result in cutting chain 130 operating under power of the motor. However, when safety switch 103 is properly manipulated (e.g., slid towards the rear of chainsaw 100, away from cutting chain and guide bar assembly 120, such as through movement by a user's thumb), the interlock may be cleared and throttle trigger 102 freed for movement (e.g., freely depressed into housing 101, such as through movement by a user's finger) to operate chainsaw 100.

In another example of a safety feature, brake assembly 160, as shown in FIG. 1C, is provided for stopping the rotation of cutting chain 130. Brake assembly 160 may, for example, be configured to provide braking to stop rotation of cutting chain 130 when manually actuated, such as through operation of brake handle 162. Brake assembly 160 may additionally or alternatively be configured to automatically engage the braking to stop rotation of cutting chain 130. For example, brake assembly 160 may be configured to engage braking in the case of kickback of chainsaw 100 during cutting operation. As another example, brake assembly 160 may be configured to engage braking when the motor is decelerated or is running at a slow speed.

The illustrated example of brake assembly 160 includes torsion spring 161 encircling chain drive mechanism clutch 111. When brake assembly 160 is engaged, torsion spring 161 is tightened against the drum of chain drive mechanism clutch 111, whereby rotation of drive sprocket 112, and correspondingly cutting chain 130, is braked and the clutch is disengaged.

As cutting chain 130 rotates, the drive link members of drive links 132 slide within the gauge of guide bar 140. Accordingly, chainsaw 100 of the illustrated example includes lubrication system 150 configured to deliver lubrication to cutting chain and guide bar assembly 120. Lubrication system 150 of embodiments may, for example, provide lubrication (e.g., in the form of machine oil) of the metal to metal sliding interface between the drive link members of drive links 132 and the surfaces of the gauge of guide bar 140, which might otherwise result in significant friction and wearing-away of surfaces.

Lubrication system 150 may be implemented in various configurations. In accordance with some embodiments, lubrication system 150 may comprise a manual lubrication pump configuration, such as the example of FIG. 2A.

Figure 2A:
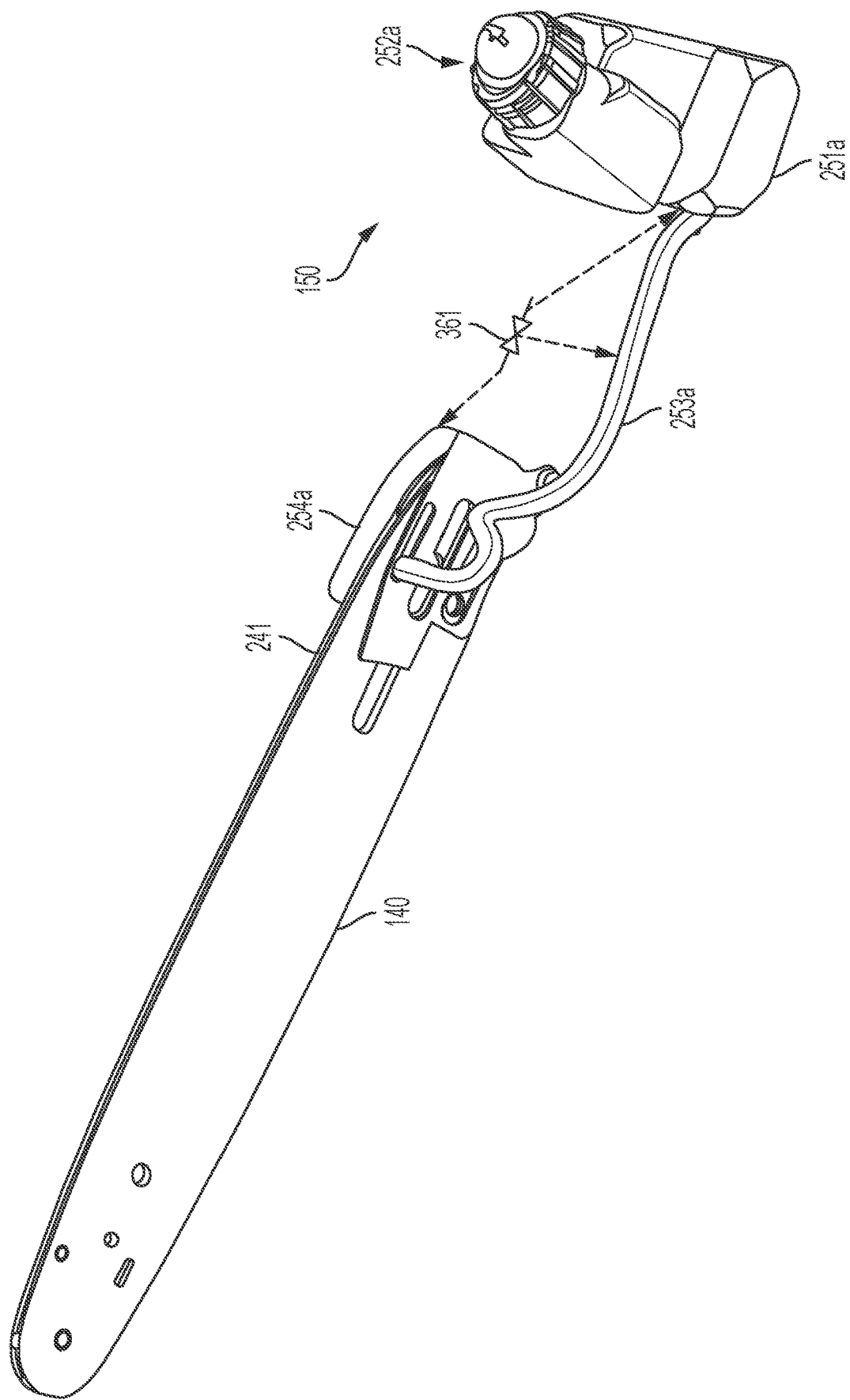
FIGS. 2A and 2B show various lubrication systems in which lubricant delivery control of embodiments of the invention may be implemented.
Figure 2B:
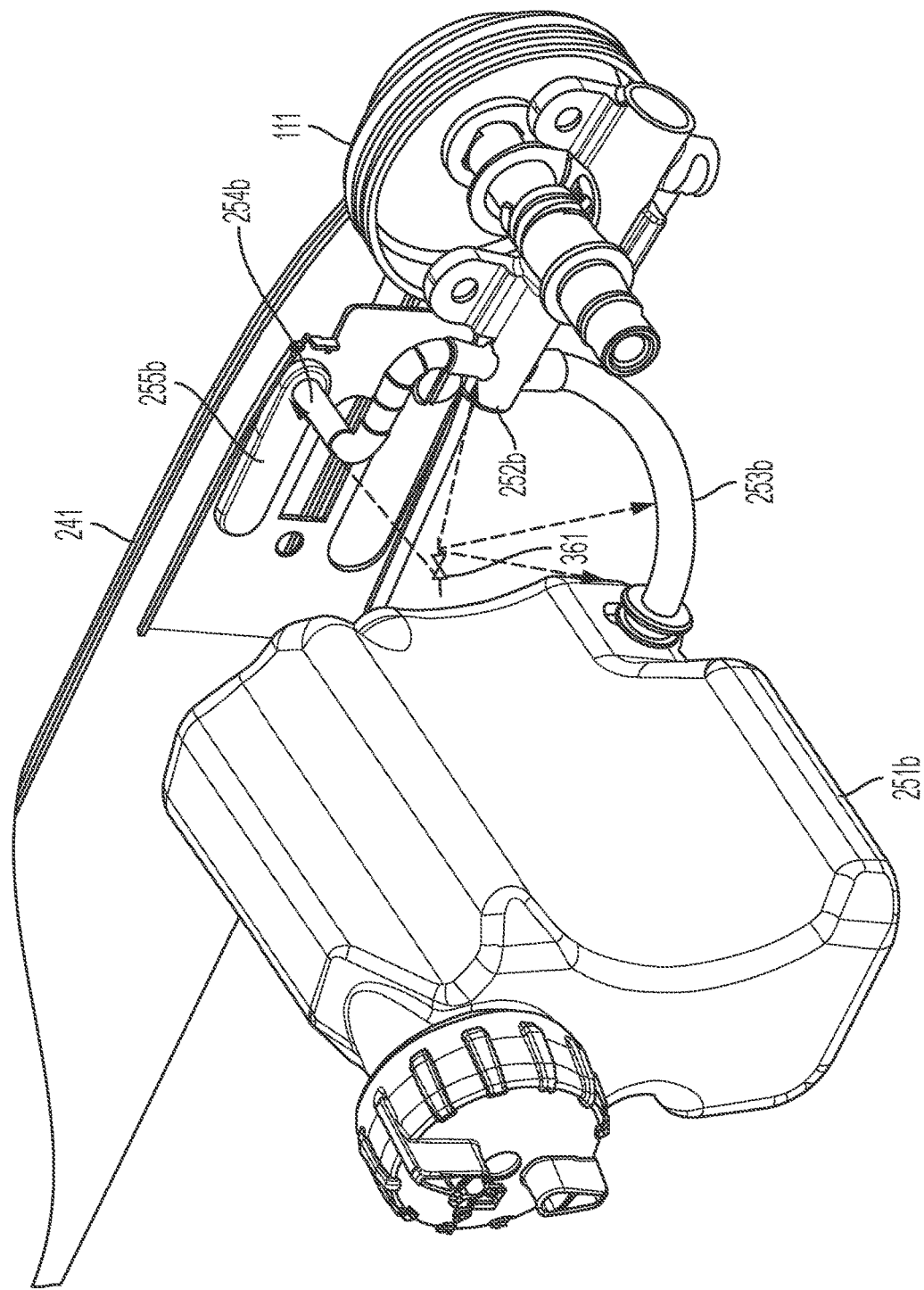

Lubrication system 150 of some embodiments may comprise an automatic lubrication pump configuration, such as the example of FIG. 2B.

The example manual lubrication pump configuration of lubrication system 150 shown in FIG. 2A includes lubricant reservoir 251*a* and lubrication pump 252*a* for delivering lubricant from the lubricant reservoir to guide bar 140 via lubricant delivery pathways 253*a* and 254*a*. Guide bar 140 may include one or more lubricant outlets in communication with gauge 241 of the guide bar, wherein lubricant is delivered to the area within the groove of the gauge by lubrication system 150. Lubrication system 150 of embodiments may include one or more lubricant delivery pathways of various configurations (e.g., tubes, channels, manifolds, etc.). In addition to lubricant delivery pathway 253*a* providing a tube for carrying lubricant, the example of lubrication system 150 illustrated in FIG. 2A includes lubricant delivery pathway 254*a* providing a chamber for delivering lubricant at guide bar 140. Lubricant delivery pathway 254*a* may, for example, comprise an elongated chamber that overlaps the lubricant inlet into the gauge of guide bar 140 to accommodate translational movement of the guide bar (and correspondingly the lubricant inlet) when the user adjusts chain tension.

In operation of lubrication system 150 of FIG. 2A, a user may manually depresses a bulb of lubrication pump 252*a* in order to provide pressure (e.g., introducing air pressure via the bulb pump mechanism) to move lubricant from lubricant reservoir 251*a*, through lubricant delivery pathways 253*a* and 254*a*, to be delivered by one or more lubricant outlets of guide bar 140 into gauge 241. The drive link members of cutting chain 130 (not shown in FIG. 2A) may pass through a delivery point of the lubricant within gauge 241 and distribute the lubricant within the gauge (e.g., around the circumference of guide bar 140).

Similar to the configuration of lubrication system 150 shown in FIG. 2A, the example automatic lubrication pump configuration of lubrication system 150 shown in FIG. 2B includes lubricant reservoir 251*b* for storing lubricant to be delivered to guide bar 140. The automatic lubrication pump implementation of FIG. 2B includes a lubrication pump 252*b* and lubricant delivery pathways 253*b*-255*b* for delivering lubricant from the lubricant reservoir to guide bar 140. In the illustrated example, lubricant deliver pathway 253*b* provides a tube for carrying lubricant from lubricant reservoir 251*b* to lubrication pump 252*b* and lubricant delivery pathway 254*b* provides a tube for carrying lubricant from lubrication pump 252*b* to cutting chain and guide bar assembly 120. Lubricant delivery pathway 255*b* of the illustrated example provides a chamber for delivering lubricant at guide bar 140 (e.g., an elongated chamber that overlaps the lubricant inlet into the gauge of guide bar 140). As with the above embodiment, guide bar 140 of the example of FIG. 2B may include one or more lubricant outlets in communication with gauge 241 of the guide bar, wherein lubricant is delivered to the area within the groove of the gauge by lubrication system 150.

In operation of lubrication system 150 of FIG. 2B, lubrication pump 252*b* may be driven by the powerhead to move lubricant from lubricant reservoir 25 lb, through lubricant delivery pathways 253*b*-255*b*, to be delivered by one or more lubricant outlets of guide bar 140 into gauge 241. For example, a cam-follower configuration may be implemented to drive a pump mechanism (e.g., trunk-piston pump) of lubrication pump 252*b*. Alternatively, lubrication pump 252*b* may comprise a separate electric pump motor to drive a pump mechanism. As described above, the drive link members of a cutting chain (not shown in FIG. 2B) may pass through a delivery point of the lubricant within gauge 241 and distribute the lubricant within the gauge (e.g., around the circumference of guide bar 140).

It should be appreciated that even when lubrication pumps (e.g., manual pump implementations such as lubrication pump 252*a* and automatic pump implementations such as lubrication pump 252*b*) of a lubrication system are inactive lubricant may nevertheless migrate from the lubricant reservoir to the lubricant outlets (e.g., due to expansion of air within the lubricant reservoir) if not otherwise checked. Accordingly, embodiments of the present invention implement a chainsaw lubricant delivery control with respect to the lubrication system, such as to allow or prevent the flow of lubricant to cutting chain and guide bar assembly 120 in correspondence to operation of the chainsaw.

Figure 3A:
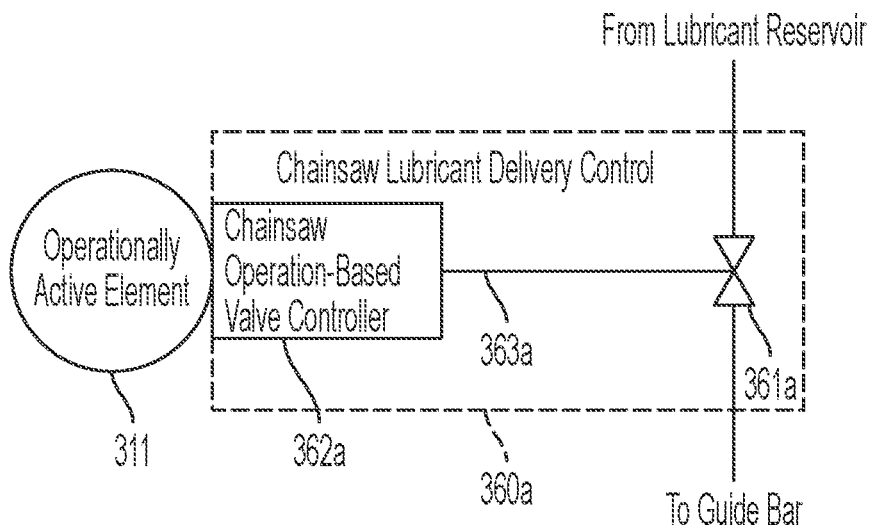
Figure 3B:
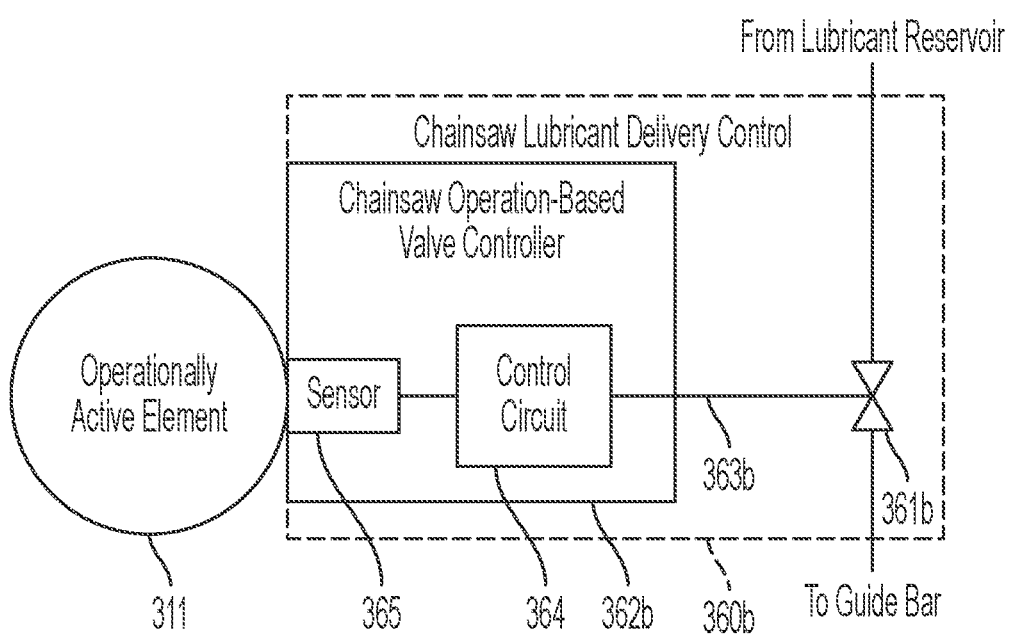

FIGS. 3A and 3B show examples of chainsaw lubricant delivery control systems of embodiments of the present invention. Chainsaw lubricant delivery control systems of embodiments include one or more lubricant flow shutoff valve in communication with a corresponding chainsaw operation-based valve controller. For example, chainsaw lubricant delivery control system 360*a* of FIG. 3A provides an implementation including lubricant flow shutoff valve 361*a* operable under mechanical control of chainsaw operation-based valve controller 362*a*. In another example, chainsaw lubricant delivery control system 360*b* of FIG. 3B provides an implementation including lubricant flow shutoff valve 361*b* operable under electrical control of chainsaw operation-based valve controller 362*b*.

According to embodiments of the invention, lubricant flow shutoff valve 361*a* or 361*b* may be disposed within lubrication system 150 of chainsaw 100 and operated by a respective one of chainsaw operation-based valve controller 362*a* or 362*b* to controllably prevent or otherwise obstruct flow of lubricant from the lubricant reservoir to cutting chain and guide bar assembly 120. For example, lubricant flow shutoff valve 361*a* or 361*b* may be controlled to prevent or otherwise obstruct flow of lubricant (e.g., the valve being placed in a closed position) from lubricant reservoir 251*a* or 251*b* to cutting chain and guide bar assembly 120 when chainsaw 100 is in a first state (e.g., an idle state in which powerhead 110 is turned off, powerhead 110 is throttled down, powerhead 110 is operating at a non-cutting power level, cutting chain 130 is not rotating, etc.). Correspondingly, lubricant flow shutoff valve 361*a* or 361*b* may be controlled to allow or otherwise permit flow of lubricant (e.g., the valve being placed in an open position) from lubricant reservoir 251*a* or 251*b* to cutting chain and guide bar assembly 120 when chainsaw 100 is in a second state (e.g., an active state in which powerhead 110 is throttled up, powerhead 110 is producing power at a cutting power level, cutting chain 130 is rotating, etc.).

The example of FIG. 3A shows chainsaw lubricant delivery control system 360*a* in which chainsaw operation-based valve controller 362*a* comprises a mechanical apparatus configured to control lubricant flow shutoff valve 361*a* in correspondence to an operational state of chainsaw 100. For example, chainsaw operation-based valve controller 362*a* may comprise a mechanical apparatus coupling operationally active element 311 of chainsaw 100 with a valve actuator of lubricant flow shutoff valve 361*a*. Chainsaw operation-based valve controller 362*a* may, for example, comprise a lever arm, cam-follower, centrifugal actuator, and/or other mechanical actuator coupled (e.g., directly or indirectly) to operationally active element 311 of chainsaw 100. In accordance with embodiments of the invention, operationally active element 311 provides operation indicative of one or more operational states of the chainsaw (e.g., a first state, such as an idle state in which the powerhead is turned off, the powerhead is throttled down, the powerhead is operating at a non-cutting power level, the cutting chain is not rotating, etc., and/or a second state, such as an active state in which the power head is throttled up, the powerhead is producing power at a cutting power level, the cutting chain is rotating, etc.). Chainsaw operation-based valve controller 362a of embodiments is configured to move in response to operationally active element 311 operation indicative of a first state and/or a second state, whereby movement is transferred via linkage 363a (e.g., one or more link arms, pin joints, bell cranks, control cables, etc.) to provide corresponding control of lubricant flow shutoff valve 361a (e.g., place the lubricant flow shutoff valve in the open position or closed position).

In an example of chainsaw lubricant delivery control system 360a, operationally active element 311 may comprise a throttle control (e.g., throttle trigger 102). Chainsaw operation-based valve controller 362a may, for example, comprise a lever arm or other member attached to or in communication (directly or indirectly) with the throttle control so as to cause movement of linkage 363a in response to movement of the throttle control. Accordingly, linkage 363a may manipulate a valve actuator of lubricant flow shutoff valve 361a to place the lubricant flow shutoff valve in the open position responsive to the throttle being engaged. Likewise, linkage 363a may manipulate the valve actuator of lubricant flow shutoff valve 361a to place the lubricant flow shutoff valve in the closed position responsive to the throttle being disengaged.

According to another example of chainsaw lubricant delivery control system 360a, operationally active element 311 may comprise a chain brake mechanism (e.g., brake assembly 160). Chainsaw operation-based valve controller 362a may, for example, comprise a lever arm or other member attached to or in communication (directly or indirectly) with the chain brake mechanism so as to cause movement of linkage 363a in response to operation of the chain brake. Accordingly, linkage 363a may manipulate a valve actuator of lubricant flow shutoff valve 361a to place the lubricant flow shutoff valve in the open position responsive to release of the chain brake. Likewise, linkage 363a may manipulate the valve actuator of lubricant flow shutoff valve 361a to place the lubricant flow shutoff valve in the closed position responsive to activation of the chain brake.

In yet another example of chainsaw lubricant delivery control system 360a, operationally active element 311 may comprise a chain drive mechanism clutch (e.g., chain drive mechanism clutch 111). Chainsaw operation-based valve controller 362a may, for example, comprise a cam follower or other member in communication (directly or indirectly) with or attached to the chain drive mechanism clutch. Accordingly, linkage 363a may manipulate a valve actuator of lubricant flow shutoff valve 361a to place the lubricant flow shutoff valve in the open position responsive to the chain drive mechanism clutch being engaged. Likewise, linkage 363a may manipulate the valve actuator of lubricant flow shutoff valve 361a to place the lubricant flow shutoff valve in the closed position responsive to the chain drive mechanism clutch being disengaged.

FIGS. 4A-4D show an implementation of a mechanical apparatus configured to control a lubricant flow shutoff valve in correspondence to an operational state of a chainsaw in accordance with the example of chainsaw lubricant delivery control system 360a above. Chainsaw lubricant delivery control system 460 of FIGS. 4A-4D may, for example, comprise an exemplary embodiment of chainsaw lubricant delivery control system 360a of FIG. 3A in which operationally active element 411, lubricant flow shutoff valve 461, chainsaw operation-based valve controller 462, and linkage 463 comprise an example implementation of operationally active element 311, lubricant flow shutoff valve 361a, chainsaw operation-based valve controller 362a, and linkage 363a, respectively.

In the illustrated example of chainsaw lubricant delivery control system 460, operationally active element 411 comprises a safety switch. Operationally active element 411 of embodiments may, for example, comprise an implementation of safety switch 103 (FIGS. 1A-1C) provided for prevention of accidental or unintentional movement of throttle trigger 102. Accordingly, operationally active element 411 includes or is otherwise coupled to trigger interlock member 412 configured to prevent depression of the throttle trigger 102 until operationally active element 411 is manipulated (e.g., slid towards the rear of the chainsaw) so that interference of the throttle trigger depression movement is cleared.

Operationally active element 411 includes or is otherwise coupled to chainsaw operation-based valve controller 462. Chainsaw operation-based valve controller 462 of the illustrated example is configured to mechanically control lubricant flow shutoff valve 461 in correspondence to an operational state of chainsaw 100. For example, chainsaw operation-based valve controller 462 of the illustrated implementation couples operationally active element 411 of chainsaw 100 with valve actuator 473 (FIGS. 4B-4D) of lubricant flow shutoff valve 461 via linkage 463. Chainsaw operation-based valve controller 462 may, for example, comprise a lever arm valve controller member coupled to operationally active element 411 of chainsaw 100, wherein chainsaw operation-based valve controller 462 is configured to move in response to operationally active element 411 operation indicative of a first state and/or a second state (e.g., safety switch throttle trigger locked position in which the chainsaw is in a cutting operation prevention state and safety switch throttle trigger unlocked position in which the chainsaw is in a cutting operation enabled state). In operation according to embodiments of chainsaw lubricant delivery control system 460, movement is transferred from operationally active element 411 via linkage 463 (e.g., push/pull cable linkage, such as a sleeved control cable) to provide corresponding control of lubricant flow shutoff valve 461 through manipulation of valve actuator 473 (e.g., place the lubricant flow shutoff valve in the open position or closed position).

It should be appreciated that, although the illustrated embodiment shows linkage 463 as comprising a push/pull cable directly coupling chainsaw operation-based valve controller 462 and valve actuator 473, additional or alternative apparatus may be utilized for implementing linkage 463 according to some embodiments. For example, in addition to or in alternative to a push/pull cable, a linkage of some implementations of chainsaw lubricant delivery control system 460 may comprise one or more link arms, pin joints, bell cranks, etc.

Lubricant flow shutoff valve 461 may comprise various configurations of valve mechanisms suitable for controlling delivery of lubricant through chainsaw lubricant delivery control system 460. The embodiment of lubricant flow shutoff valve 461 shown in the cross-section view of FIG. 4D, for example, comprises a gate valve configuration. The illustrated embodiment of lubricant flow shutoff valve 461 includes housing 471 forming or otherwise comprising an inlet configured for fluid communication with a lubricant reservoir (e.g., lubricant reservoir 251a of FIG. 2A or lubricant reservoir 251b of FIG. 2B) and an outlet configured for fluid communication with a guide bar gauge (e.g., gauge 241 of guide bar 140) via one or more lubricant pathways (e.g., lubricant delivery pathways 253a, 254a, etc.). Housing 471 of the illustrated embodiment further comprises an interior chamber in which valve gate member 472 is slidably disposed. Valve gate member 472 may be positioned (e.g., closed position) within the interior chamber of housing 471 so as to obstruct fluid communication or the flow of fluid between the inlet and outlet. Further, valve gate member 472 may be positioned (e.g., open position) within the interior chamber of housing 471 so as to enable fluid communication or the flow of fluid between the inlet and outlet. Valve actuator 473 includes an eccentric portion, interfaced with a surface of housing 471, which is coupled to valve gate member 472 via a pin joint. Accordingly, as a distal end of valve gate member 472 is moved, the eccentric portion rotates about the pin joint, resulting in movement of valve gate member 472 (e.g., between the closed position and the open position).

Figure 4A:
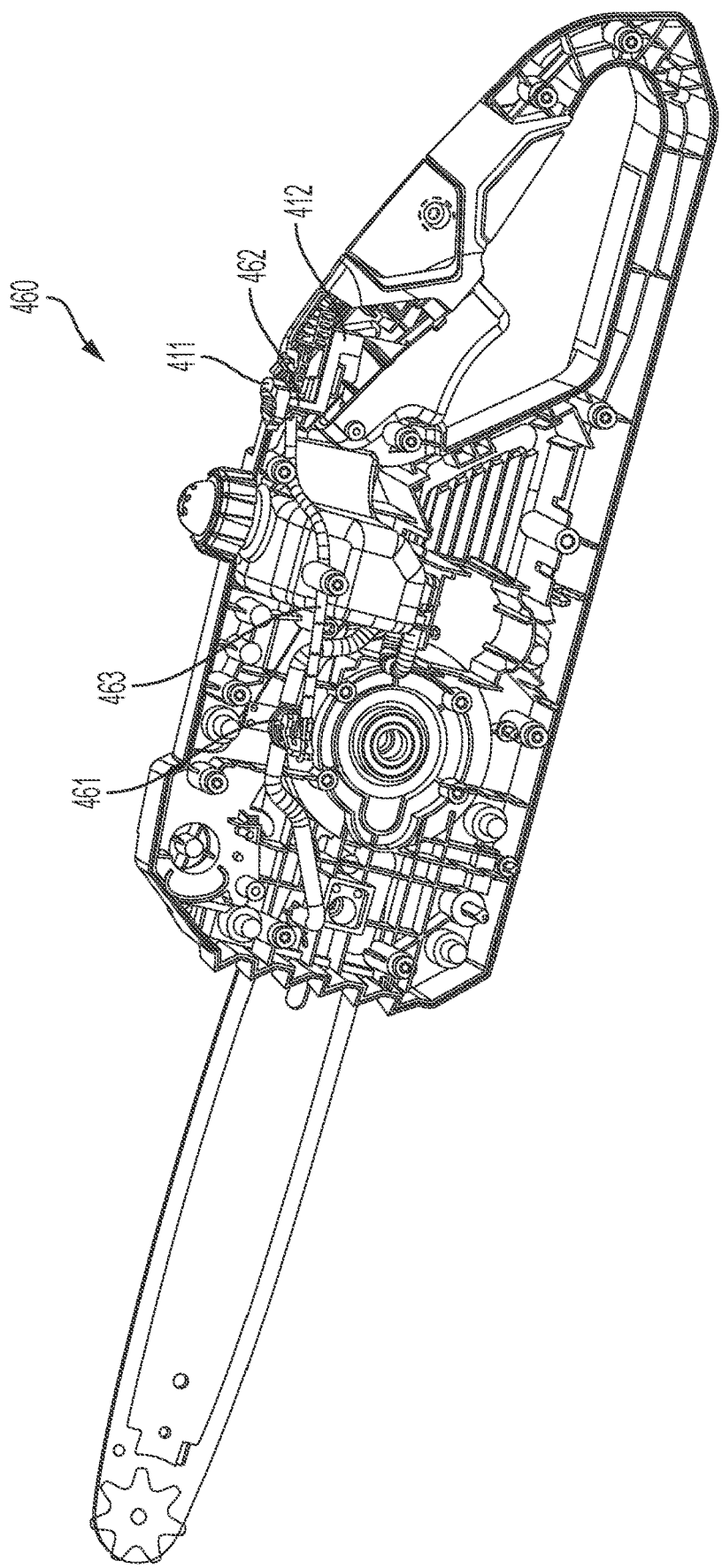
Figure 4C:
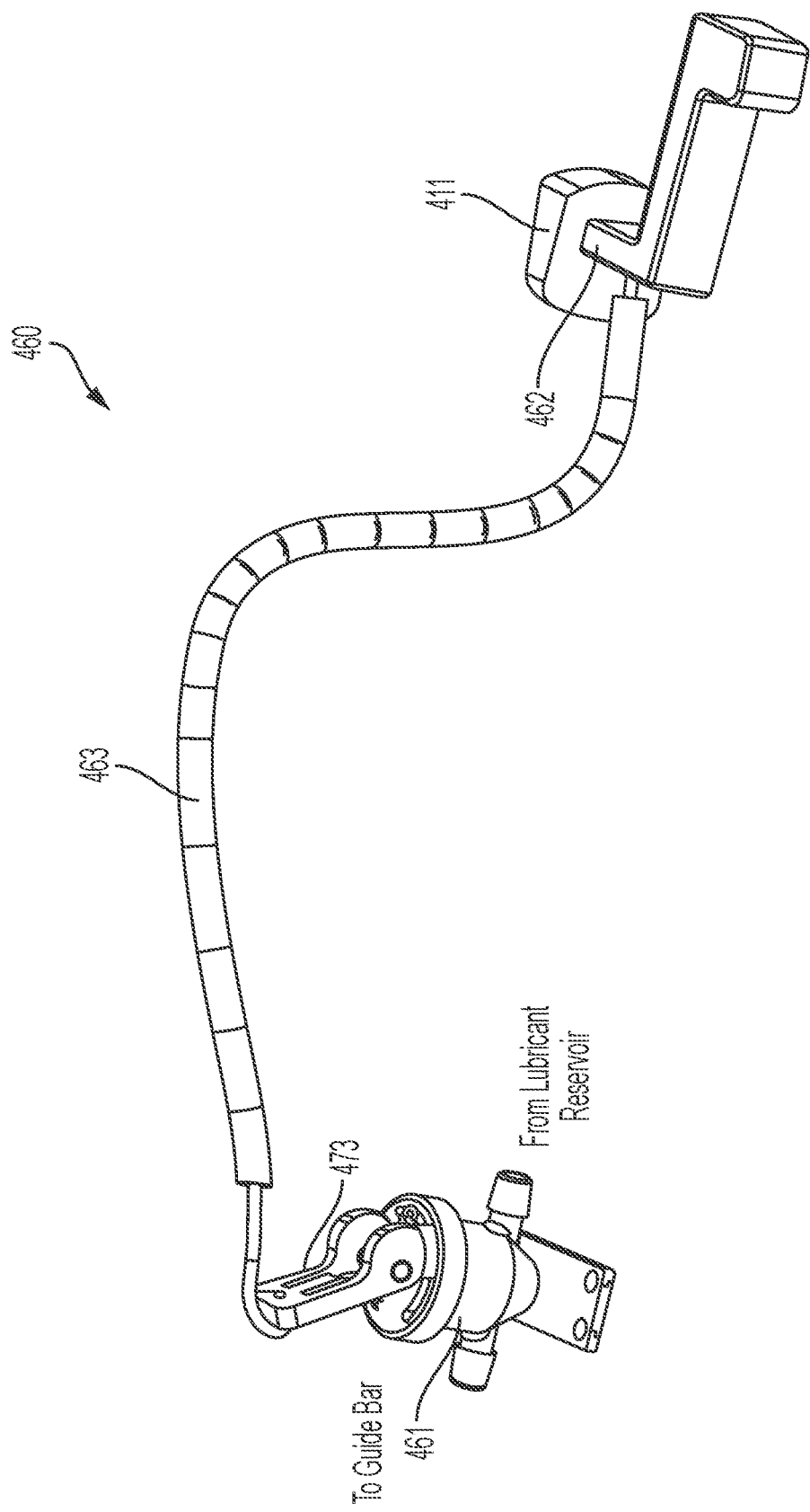
Figure 4D:
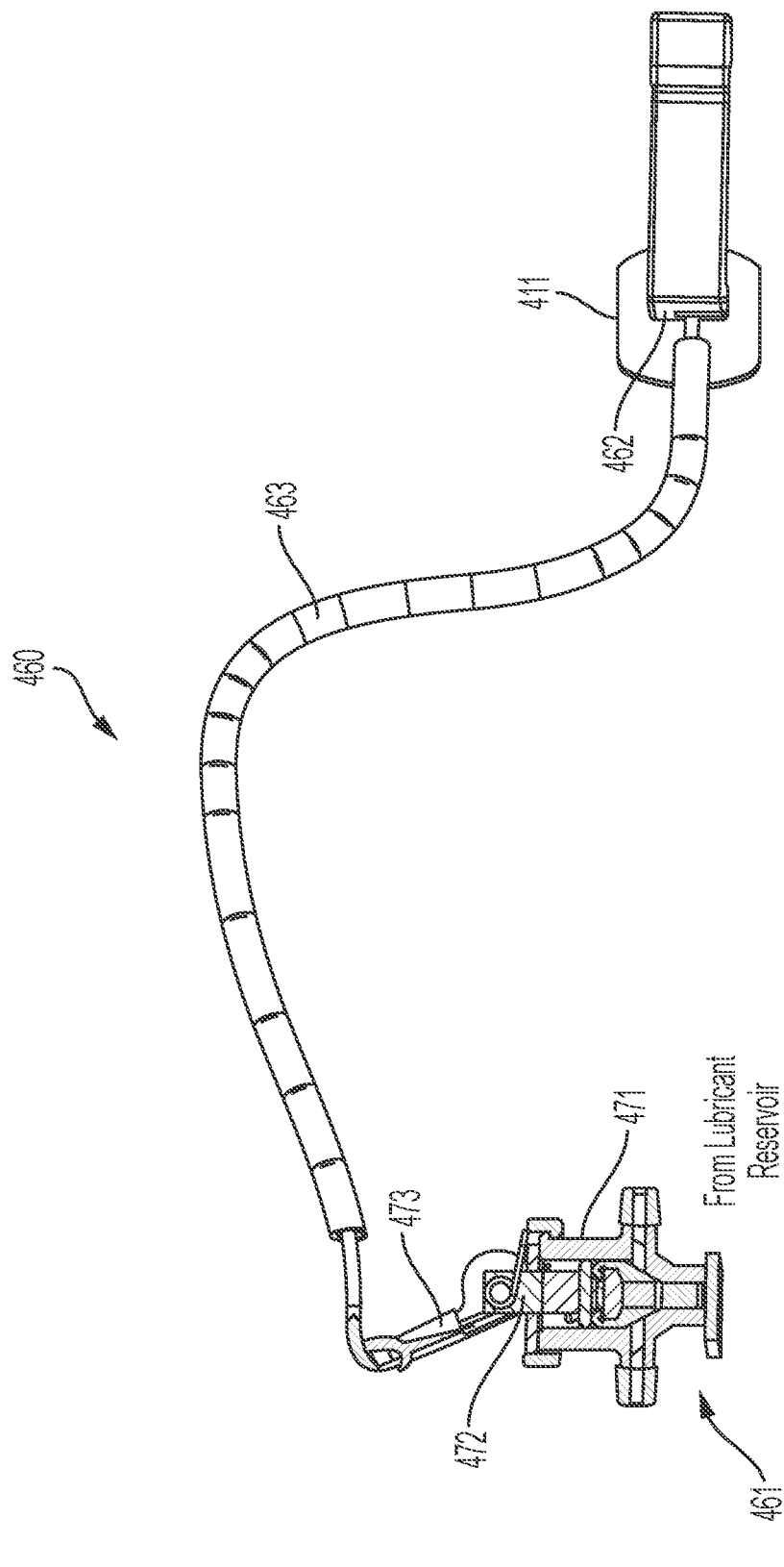

It should be appreciated that, although the embodiment illustrated in FIG. 4D shows lubricant flow shutoff valve 461 as comprising a gate valve configuration, alternative configurations may be utilized for implementing lubricant flow shutoff valve 461 according to some embodiments. For example, lubricant flow shutoff valve 461 of some embodiments may comprise a ball valve, a butterfly valve, or a plug valve configuration.

In accordance with embodiments of the invention, operationally active element 411 provides operation indicative of first and second operational states of the chainsaw (e.g., a first state, such as an idle state in which the powerhead is turned off, the powerhead is throttled down, the powerhead is operating at a non-cutting power level, the cutting chain is not rotating, etc., and/or a second state, such as an active state in which the power head is throttled up, the powerhead is producing power at a cutting power level, the cutting chain is rotating, etc.). Operation according to the illustrated embodiment of chainsaw lubricant delivery control system 460 provides for operationally active element 411 being in a first position causing, via linkage 463, valve actuator 473 to correspondingly be in a first position. For example, a first position of operationally active element 411 may comprise the safety trigger being in its forward position (e.g., safety switch throttle trigger locked position in which the chainsaw is in a cutting operation prevention state) and correspondingly a first position of valve actuator 473 may comprise the valve actuator being in its release position (e.g., valve closed position in which the flow of lubricant through lubricant flow shutoff valve 461 is prevented or otherwise obstructed). Similarly, operation according to the illustrated embodiment of chainsaw lubricant delivery control system 460 provides for operationally active element 411 being in a second position causing, via linkage 463, valve actuator 473 to correspondingly be in a second position. For example, a second position of operationally active element 411 may comprise the safety trigger being in its rearward position (e.g., safety switch throttle trigger unlocked position in which the chainsaw is in a cutting operation enabled state) and correspondingly a second position of valve actuator 473 may comprise the valve actuator being in its engaged position (e.g., valve open position in which the flow of lubricant through lubricant flow shutoff valve 461 is enabled).

Referring again to the example of FIG. 3B, chainsaw lubricant delivery control system 360b in which chainsaw operation-based valve controller 362b comprises an electronic apparatus configured to control lubricant flow shutoff valve 361b in correspondence to an operational state of chainsaw 100 is shown. For example, chainsaw operation-based valve controller 362b may comprise an electronic apparatus coupling operationally active element 311 of chainsaw 100 with a valve actuator of lubricant flow shutoff valve 361b. Chainsaw operation-based valve controller 362b of the illustrated embodiment comprises electronic control circuit 364 in communication with sensor 365. Electronic control circuit 364 may, for example, comprise circuitry in the form of one or more wires for communicating control signals to electrically manipulated apparatus of lubricant flow shutoff valve 361b. According to some examples, electronic control circuit 364 may comprise controller logic (e.g., one or more logic gates, processor operating under control of an instruction set, application specific integrated circuit (ASIC), programmable gate array (PGA), etc.), and/or other circuitry for providing electronic actuator control. Sensor 365 of embodiments may comprise various configurations of sensors, such as a switch, a Hall effect sensor, an optical sensor, etc., coupled (e.g., directly or indirectly) to operationally active element 311 of chainsaw 100. Operationally active element 311 of embodiments provides operation indicative of one or more operational states of the chainsaw, as described above. Sensor 365 of chainsaw operation-based valve controller 362b of embodiments is configured to detect operation of operationally active element 311 indicative of a first state and/or a second state (e.g., a switch is depressed/released, a Hall effect sensor detects RPMs above/below a threshold, an optical link is blocked/cleared, etc. by the operationally active element in a first and/or second state, whereby electronic control circuit 364 provides a control signal via line 363b (e.g., one or more wires, printed circuit traces, flexible printed cables, etc.) to provide corresponding control of lubricant flow shutoff valve 361b (e.g., place the lubricant flow shutoff valve in the open position or closed position).

Electronic control circuit 364 may comprise a connection to a power supply, such as a battery, magneto, alternator/generator, etc. (not shown) of chainsaw 100. According to some embodiments, sensor 365 may operate to close/open a circuit to a valve actuator of lubricant flow shutoff valve 361b for its operation in correspondence to an operational state of the chainsaw. Additionally or alternatively, electronic control circuit 364 may comprise logic operable to determine an operational state of the chainsaw based on input provided by sensor 365.

In an example of chainsaw lubricant delivery control system 360b, operationally active element 311 may comprise a throttle control (e.g., throttle trigger 102). Sensor 365 of chainsaw operation-based valve controller 362b may, for example, comprise a switch or other sensing apparatus in communication (directly or indirectly) with or attached to the throttle control so as to cause a control signal to be provided by electronic control circuit 364 to line 363b in response to movement of the throttle control. Accordingly, line 363b may signal an electronic valve actuator of lubricant flow shutoff valve 361b to place the lubricant flow shutoff valve in the open position responsive to the throttle being engaged. Likewise, line 363b may signal the electronic valve actuator of lubricant flow shutoff valve 361b to place the lubricant flow shutoff valve in the closed position responsive to the throttle being disengaged.

According to another example of chainsaw lubricant delivery control system 360b, operationally active element 311 may comprise a chain brake mechanism (e.g., brake assembly 160). Sensor 365 of chainsaw operation-based valve controller 362b may, for example, comprise a switch or other sensing apparatus in communication (directly or indirectly) with or attached to the chain brake so as to cause a control signal to be provided by electronic control circuit 364 to line 363b in response to operation of the chain brake. Accordingly, line 363b may signal an electronic valve actuator of lubricant flow shutoff valve 361b to place the lubricant flow shutoff valve in the open position responsive to release of the chain brake mechanism. Likewise, line 363b may signal the electronic valve actuator of lubricant flow shutoff valve 361b to place the lubricant flow shutoff valve in the closed position responsive to the chain brake mechanism being engaged.

In yet another example of chainsaw lubricant delivery control system 360b, operationally active element 311 may comprise a chain drive mechanism clutch (e.g., chain drive mechanism clutch 111). Sensor 365 of chainsaw operation-based valve controller 362b may, for example, comprise a Hall effect sensor or other sensing apparatus in communication (directly or indirectly) with or attached to the chain drive mechanism clutch so as to cause a control signal to be provided by electronic control circuit 364 to line 363b in response to operation of the chain drive mechanism clutch. Accordingly, line 363b may signal an electronic valve actuator of lubricant flow shutoff valve 361b to place the lubricant flow shutoff valve in the open position responsive to the chain drive mechanism clutch being engaged. Likewise, line 363b may signal the electronic valve actuator of lubricant flow shutoff valve 361b to place the lubricant flow shutoff valve in the closed position responsive to the chain drive mechanism clutch being disengaged.

The lubricant flow shutoff valves utilized according to embodiments of the invention may comprise various configurations of valve mechanisms. For example, lubricant flow shutoff valves 361a and/or 361b may comprise a ball valve (e.g., providing a relatively easily operated, fast acting valve implementation), a gate valve (e.g., providing a valve implementation which is relatively energy efficient to operate), a butterfly valve (e.g., providing a relatively easily operated, fast acting valve which may be implemented in a relatively small form factor), a plug valve (e.g., providing a valve implementation which may accommodate higher pressures), etc. In the example of FIG. 3A in which lubricant flow shutoff valve 361a is operated under mechanical control, the lubricant flow shutoff valve may comprise a valve actuator arm, wheel, lever, and/or other mechanically manipulated apparatus for moving the valve between an open position and a closed position. In the example of FIG. 3B in which lubricant flow shutoff valve 361b is operated under electrical control, the lubricant flow shutoff valve may comprise a electronic valve actuator motor, solenoid, linear actuator, and/or other electrically manipulated apparatus for moving the valve between an open position and a closed position. Lubricant flow shutoff valve 361b of some embodiments may comprise a valve actuator arm, wheel, lever, and/or other mechanically manipulated apparatus coupled to a motor, solenoid, linear actuator, and/or other electrically manipulated apparatus operative cooperatively for moving the valve between the open position and the closed position.

Lubricant flow shutoff valves of chainsaw lubricant delivery control systems of embodiments of the invention may be disposed at various locations within the lubrication system between the lubricant reservoir and a guide bar lubricant outlet. For example, as shown in the manual lubrication pump configuration of FIG. 2A, one or more lubricant flow shutoff valves 361 (e.g., lubricant flow shutoff valve 361a and/or 361b) may be disposed at an outlet of lubricant reservoir 251a that introduces lubricant to lubricant delivery pathway 253a. Additionally or alternatively, one or more lubricant flow shutoff valves 361 (e.g., lubricant flow shutoff valve 361a and/or 361b) may be disposed in lubricant delivery pathway 253a. One or more lubricant flow shutoff valves 361 (e.g., lubricant flow shutoff valve 361a and/or 361b) may be additionally or alternatively disposed at a guide bar lubricant outlet, such as where the lubricant flow shutoff valve is disposed within lubricant delivery pathway 254a (e.g., an elongated chamber for delivering lubricant at guide bar 140). In a further example, as shown in the automatic lubrication pump configuration FIG. 2B, one or more lubricant flow shutoff valves 361 (e.g., lubricant flow shutoff valve 361a and/or 361b) may be disposed at an outlet of lubricant reservoir 251b that introduces lubricant to lubricant delivery pathway 253b. Additionally or alternatively, one or more lubricant flow shutoff valves 361 (e.g., lubricant flow shutoff valve 361a and/or 361b) may be disposed in lubricant delivery pathway 253b and/or lubricant delivery pathway 254b. One or more lubricant flow shutoff valves 361 (e.g., lubricant flow shutoff valve 361a and/or 361b) may be additionally or alternatively disposed at an lubricant inlet and/or outlet of lubricant pump 252b. Additionally or alternatively, one or more lubricant flow shutoff valves 361 (e.g., lubricant flow shutoff valve 361a and/or 361b) may be disposed at a guide bar lubricant outlet, such as where the lubricant flow shutoff valve is disposed within lubricant delivery pathway 255b (e.g., an elongated chamber for delivering lubricant at guide bar 140).

The particular location of the lubricant flow shutoff valve within the lubrication system, the particular configuration of valve mechanism used, the particular implementation of the chainsaw lubricant delivery control system used, etc. may be based in whole or in part on various considerations. For example, a position for disposing a lubricant shutoff valve may be selected so as to place the lubricant shutoff valve as close as practicable to a lubricant outlet of the guide bar (e.g., to obstruct lubricant flow within all or most of the lubrication system). A particular position for disposing a lubricant shutoff valve within the lubrication system may, however, be determined based at least in part on facilitating its connection to the corresponding chainsaw operation-based valve controller. As another example, a particular configuration of valve mechanism may be selected based at least in part on a location at which the lubricant shutoff valve is disposed (e.g., a small valve form factor, such as a butterfly valve, may be selected for disposing where space is otherwise limited, such as a lubricant delivery chamber). As still another example, a particular configuration of valve mechanism may additionally or alternatively be selected based at least in part on a means by which the valve is activated (e.g., a fast acting valve configuration, such as a ball valve or butterfly valve). In yet another example, the particular implementation of the chainsaw lubricant delivery control system may be selected based at least in part on the type of motor used in the powerhead (e.g., a chainsaw lubricant delivery control system comprising a mechanical apparatus for use with respect to a gas-powered engine, a chainsaw lubricant delivery control system comprising electronic apparatus for use with respect to a battery- or electric-powered motor, etc.). It should be appreciated, however, that the foregoing are merely examples of considerations with respect to the particular locations, configurations, and/or implementations that may be utilized according to concepts of the present disclosure.

Chainsaw lubricant delivery control systems of embodiments may include features in addition to the lubricant flow shutoff valves in communication with a corresponding chainsaw operation-based valve controller described above. For example, some embodiments of a chainsaw lubricant delivery control system may include venting for relieving pressure in the lubrication system, such as may build due to temperature/pressure fluctuations experienced when the lubricant shutoff valve is closed. One or more vents may be variously disposed within the lubrication system, such as in communication with the lubricant reservoir and/or lubricant pathways. Embodiments of the present invention may, for example, dispose a vent in the lubricant reservoir cap to facilitate passage of air to control the pressure within the lubrication system responsive to temperature/pressure fluctuations.

Figure 5:
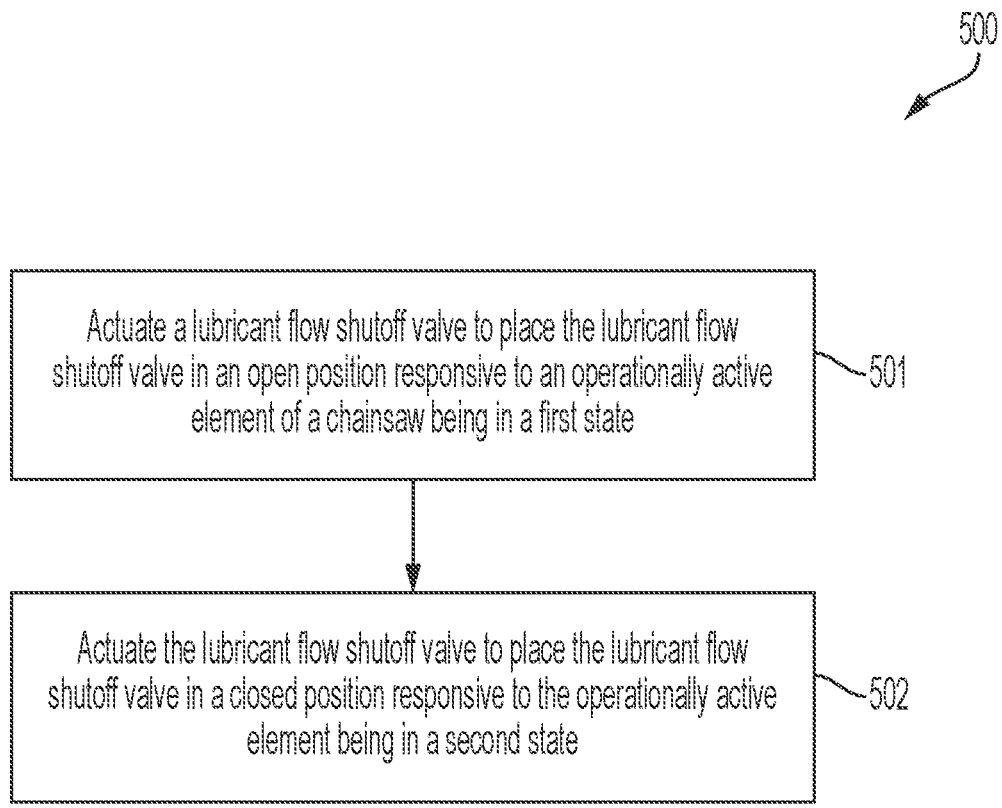
FIG. 5 shows a flow diagram providing chainsaw lubricant delivery control according to embodiments of the invention.

FIG. 5 shows a block diagram of flow 500 providing chainsaw lubricant delivery control operation according to an example embodiment of the invention. The operations of the illustrated example of flow 500 may, for example, be performed by either or both of chainsaw lubricant delivery control systems 360a and 360b described above with reference to embodiments of FIGS. 3A and 3B respectively.

At block 501 of the example of FIG. 5, a lubricant flow shutoff valve (e.g., one or more of lubricant flow shutoff valves 361, 361a, and/or 361b) is actuated to place the lubricant flow shutoff valve in an open position responsive to an operationally active element (e.g., operationally active element 311) of a chainsaw being in a first state. For example, the operationally active element may comprise a throttle control having an engaged state indicative of a corresponding operational state of the chainsaw (e.g., an active state in which the power head is throttled up, the powerhead is producing power at a cutting power level, the cutting chain is rotating, etc.). In another example, the operationally active element may comprise a chain brake mechanism having a released state indicative of a corresponding operational state of the chainsaw (e.g., an active state in which the power head is throttled up, the powerhead is producing power at a cutting power level, the cutting chain is rotating, etc.). In yet another example, the operationally active element may comprise a chain drive mechanism clutch an engaged state indicative of a corresponding operational state of the chainsaw (e.g., an active state in which the power head is throttled up, the powerhead is producing power at a cutting power level, the cutting chain is rotating, etc.).

The lubricant flow shutoff valve may, for example, be disposed within the chainsaw between a lubrication system lubricant reservoir and a guide bar lubricant outlet. A chainsaw operation-based valve controller (e.g., chainsaw operation-based valve controller 362a and/or 362b) may be coupled to the operationally active element and the lubricant flow shutoff valve to provide control for actuating the lubricant flow shutoff valve for facilitating flow of lubricant. For example, the lubricant flow shutoff valve may be controlled by the chainsaw operation-based valve controller to allow or otherwise permit flow of lubricant (e.g., the valve being placed in an open position) from the lubricant reservoir to cutting chain and the guide bar assembly when the chainsaw is in an active state as indicated by the state of the operationally active element.

At block 502 of flow 500, the lubricant flow shutoff valve is actuated to place the lubricant flow shutoff valve in a closed position responsive to the operationally active element being in a second state. For example, the operationally active element may comprise a throttle control having a disengaged state indicative of a corresponding operational state of the chainsaw (e.g., an idle state in which the powerhead is turned off, the powerhead is throttled down, the powerhead is operating at a non-cutting power level, the cutting chain is not rotating, etc.). In another example, the operationally active element may comprise a chain brake mechanism having an engaged state indicative of a corresponding operational state of the chainsaw (e.g., an idle state in which the powerhead is turned off, the powerhead is throttled down, the powerhead is operating at a non-cutting power level, the cutting chain is not rotating, etc.). In yet another example, the operationally active element may comprise a chain drive mechanism clutch an disengaged state indicative of a corresponding operational state of the chainsaw (e.g., an idle state in which the powerhead is turned off, the powerhead is throttled down, the powerhead is operating at a non-cutting power level, the cutting chain is not rotating, etc.).

The chainsaw operation-based valve controller may further be coupled to the operationally active element and the lubricant flow shutoff valve to provide control for actuating the lubricant flow shutoff valve for obstructing flow of lubricant. For example, the lubricant flow shutoff valve may be controlled by the chainsaw operation-based valve controller to prevent or otherwise obstruct flow of lubricant (e.g., the valve being placed in a closed position) from the lubricant reservoir to cutting chain and the guide bar assembly when the chainsaw is in an idle state as indicated by the state of the operationally active element.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A chainsaw comprising a lubricant delivery control system, the lubricant delivery control system comprising:
   a lubricant flow shutoff valve disposed within the chainsaw between a lubrication system lubricant reservoir and a guide bar lubricant outlet; and
   a chainsaw operation-based valve controller coupling a trigger interlock of the chainsaw and the lubricant flow shutoff valve, the trigger interlock preventing depression of a throttle trigger of the chainsaw when the trigger interlock is disposed in a first position and enabling depression of the throttle trigger when the trigger interlock is disposed in a second position different than the first position, wherein the chainsaw operation-based valve controller comprises:
- a sensor that senses a position of the trigger interlock, wherein the position comprises one of a first position and a second position; and
- a control circuit that controls the lubricant flow shutoff valve between an open position and a closed position responsive to the trigger interlock being sensed by the sensor in a respective one of the first position and the second position.

2. The chainsaw of claim 1, wherein the lubricant flow shutoff valve is disposed between the guide bar lubricant outlet and a lubrication pump, the lubrication pump selectively driving lubricant from the lubricant reservoir to the guide bar lubricant outlet.

3. The chainsaw of claim 2, wherein the chainsaw comprises a motor to drive a cutting chain of the chainsaw about a guide bar of the chainsaw, and wherein the lubrication pump is driven by an electric pump motor.

4. The chainsaw of claim 2, wherein the chainsaw comprises a motor to drive a cutting chain of the chainsaw about a guide bar of the chainsaw, and wherein the lubrication pump is driven by the motor.

5. The chainsaw of claim 1, wherein the sensor comprises a Hall effect sensor.

6. The chainsaw of claim 5, wherein the Hall effect sensor detects a rotational speed associated with the chainsaw, and wherein the control circuit compares the detected rotational speed to a threshold speed to determine whether the trigger interlock is in the first position or the second position.

7. The chainsaw of claim 1, wherein the chainsaw operation-based valve controller is coupled to the lubricant flow shutoff valve by a line, and wherein the line is configured to transmit an electronic signal to the lubricant flow shutoff valve based on the sensed trigger interlock being in a respective one of the first position and the second position.

8. The chainsaw of claim 1, wherein the trigger interlock slides towards a rear end of the chainsaw to move from the first position to the second position.

9. A chainsaw comprising:
- a lubricant reservoir configured to store lubricant for delivery to a cutting chain and guide bar assembly;
- a guide bar of the cutting chain and guide bar assembly, wherein the guide bar includes one or more lubricant outlets in fluid communication with the lubricant reservoir via at least one lubricant delivery pathway;
- a motor to drive a cutting chain of the cutting chain and guide bar assembly about the guide bar;
- a lubricant flow shutoff valve disposed between the lubricant reservoir and the one or more lubricant outlets;
- a lubrication pump to deliver lubricant through the at least one lubricant delivery pathway, wherein the lubrication pump is driven by an electric pump motor; and
- a chainsaw operation-based valve controller mechanically coupling a trigger interlock of the chainsaw and the lubricant flow shutoff valve, the trigger interlock preventing depression of a throttle trigger of the chainsaw when the trigger interlock is disposed in a first position and to enable depression of the throttle trigger when the trigger interlock is disposed in a second position, wherein the chainsaw operation-based valve controller is configured to control the lubricant flow shutoff valve between an open position and a closed position responsive to the trigger interlock being in a respective one of the first position and the second position, wherein the lubricant flow shutoff valve is mechanically coupled to the trigger interlock for push and pull manipulation of the lubricant flow shutoff valve in response to operation of the trigger interlock between the first position and the second position;
and wherein the chainsaw operation-based valve controller comprises:
- a lever arm valve controller member coupled to the trigger interlock; and
- a linkage coupled to the lever arm valve controller member and a valve actuator of the lubricant flow shutoff valve, wherein the linkage is configured to manipulate a valve actuator of the lubricant flow shutoff valve and place the lubricant flow shutoff valve in the closed position responsive to the trigger interlock being disposed in the first position and place the lubricant flow shutoff valve in the open position responsive to the trigger interlock being disposed in the second position, wherein the linkage comprises a control cable configured for push and pull manipulation of the valve actuator.

10. The chainsaw of claim 9, wherein the chainsaw operation-based valve controller comprises:
- a sensor that senses a position of the trigger interlock, wherein the position comprises the first position and the second position; and
- a control circuit that controls the lubricant flow shutoff valve between the open position and the closed position.

11. The chainsaw of claim 9, wherein the lubricant flow shutoff valve is disposed between the one or more lubricant outlets and the lubrication pump.

12. The chainsaw of claim 9, wherein the trigger interlock comprises a switch that slides in a linear direction to affect push and pull manipulation of the lubricant flow shutoff valve between the open and closed positions.

13. The chainsaw of claim 9, wherein the lubricant flow shutoff valve is mechanically coupled to the trigger interlock for push and pull manipulation of the lubricant flow shutoff valve by a control cable.

14. A method for chainsaw lubricant delivery control, the method comprising:
- sensing, by a sensor of a chainsaw operation-based valve controller, a position of a trigger interlock of a chainsaw, the position including one of a first position and a second position, wherein the trigger interlock prevents depression of a throttle trigger of the chainsaw when the trigger interlock is disposed in the first position and enables depression of the throttle trigger when the trigger interlock is disposed in the second position;
- actuating, by a control circuit of the chainsaw operation-based valve controller, a lubricant flow shutoff valve to place the lubricant flow shutoff valve in an open position responsive to the trigger interlock being in the second position, wherein the lubricant flow shutoff valve is disposed within the chainsaw between a lubrication system lubricant reservoir and a guide bar lubricant outlet, and wherein the chainsaw operation-based valve controller couples the trigger interlock and the lubricant flow shutoff valve; and
- actuating, by the control circuit of the chainsaw operation-based valve controller, the lubricant flow shutoff valve to place the lubricant flow shutoff valve in a closed position responsive to the trigger interlock being in the first position.

15. The method of claim 14, wherein the chainsaw operation-based valve controller comprises a lever arm valve controller member coupled to the trigger interlock, wherein the chainsaw operation-based valve controller is configured to move in response to operation of the trigger interlock between the first position and the second position.

16. The method of claim 15, wherein a linkage coupled to the lever arm valve controller member and a valve actuator of the lubricant flow shutoff valve manipulates the valve actuator and places the lubricant flow shutoff valve in the closed position responsive to the trigger interlock being disposed in the second position and place the lubricant flow shutoff valve in the open position responsive to the trigger interlock being disposed in the first position.

17. The method of claim 16, wherein the linkage comprises a control cable configured for push and pull manipulation of the valve actuator.

* * * * *